(12) United States Patent
Roth et al.

(10) Patent No.: US 9,003,983 B2
(45) Date of Patent: Apr. 14, 2015

(54) APPARATUS AND METHOD FOR NO-TILL INTER-ROW SIMULTANEOUS APPLICATION OF HERBICIDE AND FERTILIZER, SOIL PREPARATION, AND SEEDING OF A COVER CROP IN A STANDING CROP

(75) Inventors: Gregory W. Roth, Furnace, PA (US);
Corey Dillon, Port Matilda, PA (US);
William Curran, Centre Hall, PA (US);
Christian Houser, Woodward, PA (US)

(73) Assignee: The Penn State Research Foundation, University Park, PA (US)

( * ) Notice: Subject to any disclaimer, the term of this patent is extended or adjusted under 35 U.S.C. 154(b) by 491 days.

(21) Appl. No.: 13/443,339

(22) Filed: Apr. 10, 2012

(65) Prior Publication Data
US 2012/0260836 A1    Oct. 18, 2012

Related U.S. Application Data

(60) Provisional application No. 61/474,501, filed on Apr. 12, 2011.

(51) Int. Cl.
| | | |
|---|---|---|
| A01C 7/08 | (2006.01) | |
| A01C 7/06 | (2006.01) | |
| A01C 7/00 | (2006.01) | |
| A01C 23/04 | (2006.01) | |

(52) U.S. Cl.
CPC . *A01C 7/06* (2013.01); *A01C 7/006* (2013.01); *A01C 23/047* (2013.01)

(58) Field of Classification Search
USPC ........... 111/52, 121, 129, 130, 186–188, 200, 111/923, 924
See application file for complete search history.

(56) References Cited

U.S. PATENT DOCUMENTS

| | | | | |
|---|---|---|---|---|
| 2,066,610 | A | * | 1/1937 | Carlin ............................ 111/14 |
| 2,556,072 | A | | 6/1951 | Dewey |
| 2,586,032 | A | | 2/1952 | Haley |
| 2,663,973 | A | * | 12/1953 | White .............................. 47/1.7 |
| 2,734,439 | A | * | 2/1956 | Padrick ........................ 172/156 |
| 3,110,275 | A | | 11/1963 | Bonney |
| 3,348,505 | A | * | 10/1967 | Smith ........................... 111/187 |
| 3,491,709 | A | | 1/1970 | Fleischer et al. |
| 3,701,327 | A | | 10/1972 | Krumholz |
| 3,744,441 | A | | 7/1973 | Smith et al. |
| 3,831,536 | A | | 8/1974 | Orthman |
| 4,048,929 | A | | 9/1977 | Zumbahlen |
| 4,054,007 | A | * | 10/1977 | Moore ............................ 47/1.7 |

(Continued)

OTHER PUBLICATIONS

Mintz, M., "No-Tillers Finding New Ways to 'Cover Up'", *No-Till Farmer*, SPRE: No-Till Farmer E-Tip: Feb. 15, 2012 (http://www.no-tillfarmer.com/pages/Spre/E-Tip-No-Tillers-Finding-New-Ways-To-Cover-Up.php).

(Continued)

*Primary Examiner* — Alicia Torres
(74) *Attorney, Agent, or Firm* — Gifford, Krass, Sprinkle, Anderson & Citkowski, P.C.; Douglas L. Wathen

(57) ABSTRACT

A no-till apparatus for application of herbicide and fertilizer, soil preparation, and seeding of a cover crop in a standing crop has inter-row assemblies configured to pass along inter-row areas between adjacent row lines of standing crop plants. Each assembly includes a fertilizer applicator, a no-till soil preparation element, a cover crop seed applicator, and a post-seeding element.

20 Claims, 6 Drawing Sheets

(56) References Cited

U.S. PATENT DOCUMENTS

| | | |
|---|---|---|
| 4,062,305 A | 12/1977 | Stoker |
| 4,084,522 A | 4/1978 | Younger |
| 4,100,862 A | 7/1978 | Mowen et al. |
| 4,244,306 A | 1/1981 | Peterson et al. |
| 4,266,489 A | 5/1981 | Parramore |
| 4,377,979 A | 3/1983 | Peterson et al. |
| 4,611,545 A * | 9/1986 | Nickeson et al. ............... 111/52 |
| 5,303,662 A | 4/1994 | Drake |
| 5,333,559 A | 8/1994 | Hodapp et al. |
| 5,370,068 A | 12/1994 | Rawson et al. |
| 5,375,542 A * | 12/1994 | Schaffert .................... 111/192 |
| 5,724,902 A | 3/1998 | Janelle et al. |
| 5,724,903 A | 3/1998 | Yoder et al. |
| 5,787,994 A | 8/1998 | Friesen |
| 6,553,925 B1 | 4/2003 | Beaujot |
| 6,997,121 B2 | 2/2006 | Buchholtz |
| 7,597,055 B2 | 10/2009 | Choulet |

OTHER PUBLICATIONS

Hively, W.D., Cox, W.J., "Interseeding Cover Crops into Soybean and Subsequent Corn Yields," *Agron. J.*, 93:308-313 (2001).

Scott, T.W., Mt. Pleasant, J., Burt, R.F., Otis, D.J., "Contributions of Ground Cover, Dry Matter, and Nitrogen from Intercrops and Cover Crops in a Corn Polyculture System," *Agron. J.*, 79:792-798 (1987).

\* cited by examiner

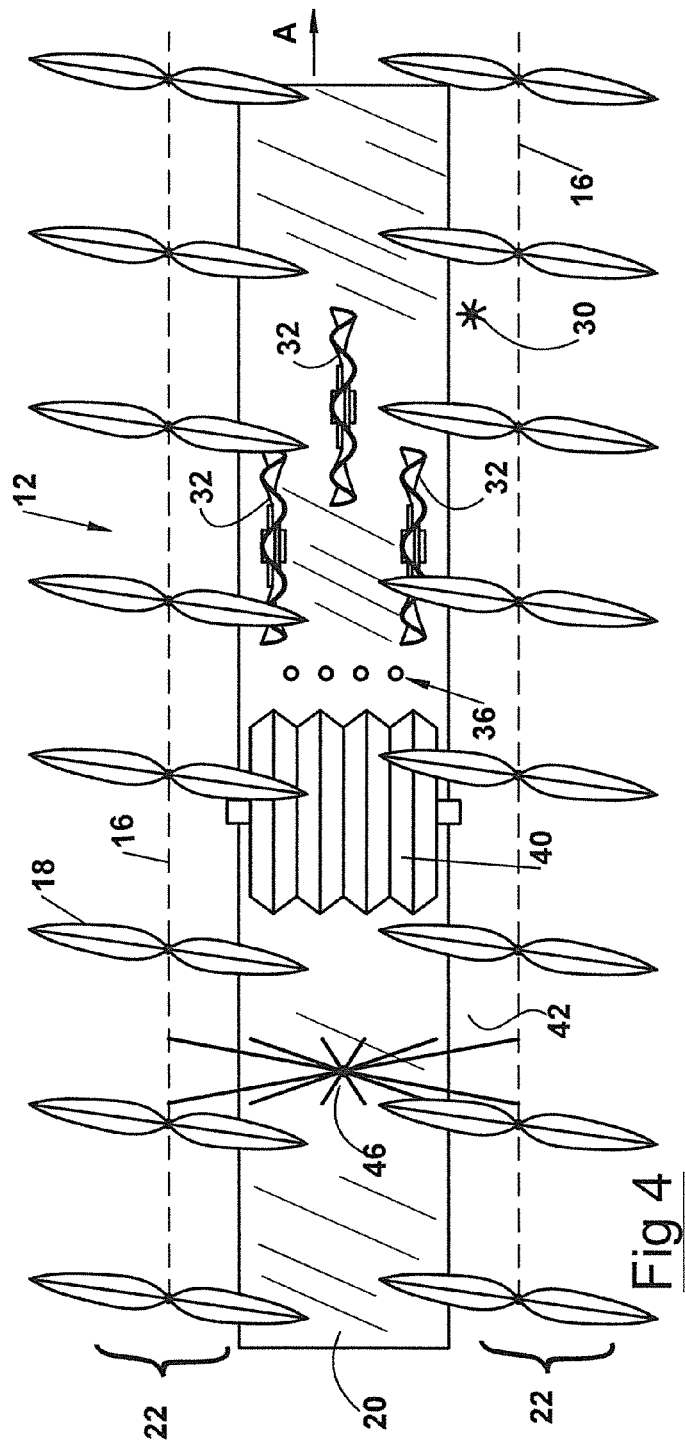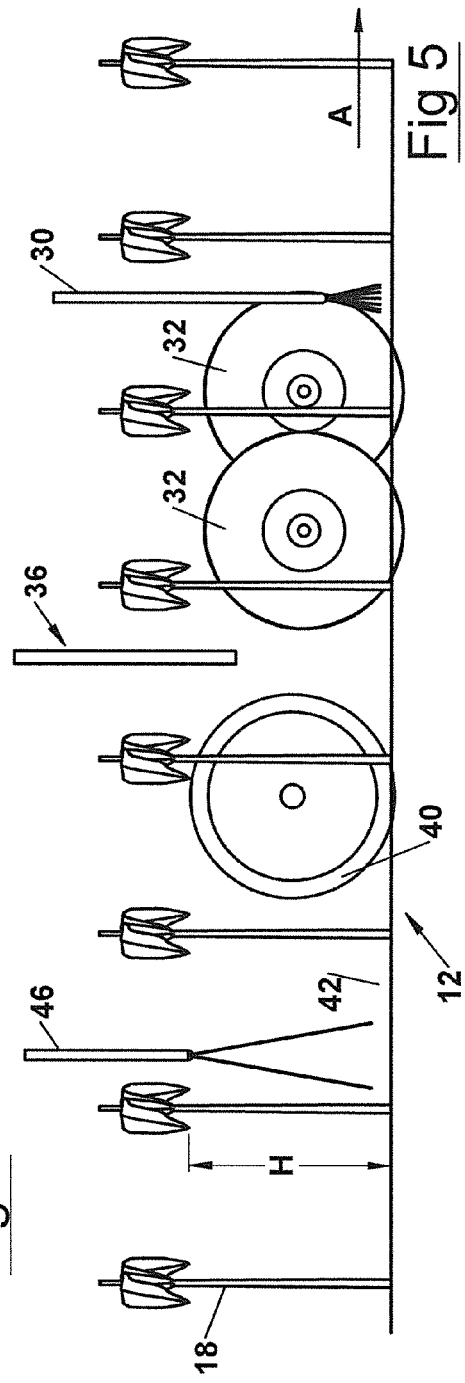
Fig 4
Fig 5

APPARATUS AND METHOD FOR NO-TILL INTER-ROW SIMULTANEOUS APPLICATION OF HERBICIDE AND FERTILIZER, SOIL PREPARATION, AND SEEDING OF A COVER CROP IN A STANDING CROP

CROSS REFERENCE TO RELATED APPLICATION

This patent application claims priority to U.S. provisional patent application Ser. No. 61/474,501, filed Apr. 12, 2011, the entire content of which is incorporated herein in its entirety.

STATEMENT OF GOVERNMENT SPONSORSHIP

This invention was made with government support under PEN04166 awarded by the U.S. Department of Agriculture. The government has certain rights in the invention.

FIELD OF THE INVENTION

The present invention relates to a method and apparatus for seeding a cover crop in a no-till field while simultaneously applying a fertilizer and herbicide to the crop.

BACKGROUND OF THE INVENTION

Modern corn production tactics are being adopted that help to mitigate the impact of corn production on soil and water resources. Several of these tactics include no-tillage production, the use of delayed "sidedress" nitrogen fertilizer applications, delayed or postemergent herbicide applications and the establishment of cover crops during or following the corn crop. In no-tillage production, the field is not plowed or cultivated between crops. No-tillage production reduces the potential for soil erosion, conserves soil moisture, and reduces the energy associated with corn production. Sidedress nitrogen fertilizer applications reduce the potential for nitrogen fertilizer loss by applying the fertilizer immediately prior to the greatest demand by the crop. Postemergent herbicide applications allow corn producers to use less persistent herbicides prior to planting the crop and their use has been greatly increased by the development of both glyphosate and glufosinate herbicide resistant corn hybrids during the last decade. The establishment of cover crops following harvest has been promoted and is now required in some situations to minimize runoff and plant nutrient losses from either residual amounts of fertilizer not used by the corn crop or from animal manure applications made to the field following harvest.

The establishment of cover crops is often limited by the late fall harvest of the corn crop in some areas, which leaves little growing season for a cover crop, such as clover or ryegrass, to become established. Alternative seeding methods such as broadcasting the seed in the standing crop prior to harvest with a helicopter or ground based applicator have been inconsistent, especially in no-till fields that are covered with the residue from the previous crop. Researchers from Cornell (Scott et al., 1987) have reported successfully seeding cover crops during the late spring in fields that were tilled with minimal residue on the soil surface with no impact on crop yields. In this system, cover crop seeds were broadcast on the soil surface and incorporated using a row crop cultivator. A second study showed that this system could be used in soybean production as well (Hively and Cox, 2001).

Other researchers have proposed to plant a standing crop in an existing cover crop without the need to perform a cover crop seeding operation in the late spring. This tactic, often called a living mulch, can be effective but requires the suppression of the cover crop with a herbicide at the time of planting of the standing crop to avoid undue competition with the main, or standing, crop, such as corn. Canadian researchers have reported the effective use of seeding devices that can establish cover crops in a standing crop of corn in a tilled seedbed (see http://www.farmwest.com/index.cfm?method=library.showPage&librarypageid=66), however the device described only performs a seeding operation and is not adequate for use in no-till systems. Their experience demonstrated the potential utility of this in-season cover crop or "relay crop" as a part of corn production. Another unit for performing row crop cultivation and seeding has been developed for minimum tillage conditions, as shown in U.S. Pat. No. 5,333,559, but it lacks some of the elements and benefits of the present invention. A further device is shown in U.S. Pat. No. 5,370,068. Again, it lacks some elements and benefits of the present invention.

There remains a need for apparatus and methods for planting a cover crop between the rows of a standing crop in a no-till field.

SUMMARY OF THE INVENTION

The present invention provides a method and apparatus for seeding a cover crop in a no-till field while simultaneously applying a fertilizer and herbicide to the crop. This method allows corn growers to combine several trips across the field and establish a cover crop in the growing corn crop which will provide multiple benefits following the harvest of the corn crop and reduce the impact of corn production on the soil and surface and groundwater resources.

A first embodiment of a no-till apparatus for simultaneous application of herbicide and fertilizer, soil preparation, and the seeding of a cover crop in a standing crop is disclosed herein. The plants of the standing crop define a plurality of generally parallel row lines and a standing crop row area is defined around each row line so as to contain the row line plants and extend between generally parallel edges to each side of the row line. An inter-row area is defined between each pair of adjacent standing crop row areas and extends between the closest edges of the adjacent standing crop row areas. The apparatus includes a plurality of inter-row assemblies each configured to pass along one of the inter-row areas between adjacent row lines of standing crop plants. Each assembly includes a fertilizer applicator operable to apply fertilizer to one of the standing crop row areas adjacent the inter-row area without substantial application of fertilizer to the inter-row area. Each assembly also includes a no-till soil preparation element operable to prepare soil in the inter-row area for cover crop seeding without forming a furrow. The soil has an upper surface with no-till crop residue disposed thereon, and the no-till soil preparation element is operable to generally cut through the crop residue so as to at least break up an upper surface of soil under the residue for cover crop seeding. Each assembly further includes a cover crop seed applicator operable to apply cover crop seed across the inter-row area after the soil preparation element. Each assembly also includes a post-seeding element operable to at least partially firm the soil and provide seed to soil contact in the inter-row area after the seed applicator applies seed. Each assembly further includes an herbicide applicator operable to apply herbicide to the inter-row area and at least part of the adjacent standing crop row area. The apparatus prepares the soil, applies seed and firms the soil in the inter-row areas, applies fertilizer to the standing crop row areas, and applies herbicide to the inter-row and standing crop row areas.

The apparatus may further include a support frame for supporting a plurality of inter-row assemblies and/or a hitch assembly for attaching the apparatus to a tractor. In some versions, the fertilizer applicator is a sprayer operable to apply a liquid fertilizer to one of the row areas without substantial application to the inter-row area or to the standing crop plants. This fertilizer sprayer may apply a narrow spray centered approximately four inches from the row line.

In some versions, the no-till soil preparation element comprises a plurality of coulters. There may be three coulters, including a leading, a mid, and a trailing coulter. Each coulter may be approximately two inches wide with the coulters being spaced apart side-to-side by approximately four inches.

Preferred embodiments of the present invention do not include any power driven soil preparation elements, such as a power driven tilling assembly that cuts into and turns over part of the soil.

In some versions, the seed applicator comprises a plurality of seed tubes positioned side-by-side. In certain versions, the post-seeding element comprises the packing wheel and in some alternatives the post-seeding element further comprises a spring loading mechanism operable to urge the packing wheel towards the soil.

In some versions, the herbicide applicator is a sprayer operable to spray herbicide in a wide pattern. This pattern may be wide enough to cover the entirety of the inter-row area and at least a portion of one or more of the adjacent standing crop row areas.

A second embodiment of the present invention provides a no-till apparatus for simultaneous application of fertilizer, soil preparation, and seeding of a cover crop and a standing crop. The plants of the standing crop define a plurality of generally parallel row lines. The standing crop row area is defined around each row line so as to contain the row line of plants and extends between generally parallel edges to each side of the row line. An inter-row area is defined between each pair of adjacent standing crop row areas and extends between the closest edges of the adjacent standing crop row areas. The apparatus includes a plurality of inter-row assemblies each configured to pass along one of the inter-row areas between adjacent row lines of standing crop plants. Each assembly includes a fertilizer applicator operable to apply fertilizer to one of the standing crop row areas adjacent the inter-row area without substantial application of fertilizer to the inter-row area. Each assembly also includes a no-till soil preparation element operable to prepare soil in the inter-row area for cover crop seeding without forming a furrow. The soil has an upper surface with no-till crop residue disposed thereon, and the no-till soil preparation element is operable to generally cut through the crop residue so as to at least break up an upper surface of soil under the residue for cover crop seeding. Each assembly further includes a cover crop seed applicator operable to apply cover crop seed across the inter-row area after the soil preparation element. Each assembly also includes a post-seeding element operable to at least partially firm the soil and provides seed to soil contact in the inter-row area after the seed applicator applies seed. Each assembly prepares the soil, applies seed, and firms the soil in one of the inter-row areas and applies fertilizer to one of the standing crop row areas in a single pass.

The present invention also provides a no-till method of planting a cover crop between the rows of a standing crop and simultaneously applying fertilizer and herbicide. The plants of the standing crop define a plurality of generally parallel row lines. A standing crop row area is defined around each row line so as to contain the row line of plants and extends between generally parallel edges to each side of the row line. An inter-row area is defined between each pair of adjacent standing crop row areas and extends between the closest edges of the adjacent standing crop row areas. The method includes the step of providing a no-till apparatus for simultaneous application of herbicide and fertilizer, soil preparation and seeding of a cover crop and a standing crop. The apparatus includes a plurality of inter-row assemblies each configured to pass along one of the inter-row areas between adjacent row lines of standing crop plants. Each assembly includes a fertilizer applicator, a no-till soil preparation element, a cover crop seed applicator, a post-seeding element, and an herbicide applicator. The method further includes the step of using the fertilizer applicator to apply fertilizer to one of the standing crop row areas adjacent the inter-row area without substantial application of fertilizer to the inter-row area. The method also includes using the no-till soil preparation element to prepare soil in the inter-row area without forming a furrow. The soil has an upper surface with no-till crop residue disposed thereon, and the no-till soil preparation element generally cuts through the crop residue so as to at least break up an upper surface of soil under the residue for cover crop seeding. The method also includes using the cover crop seed applicator to apply cover crop seed across the inter-row area after using the soil preparation element. The method further includes the step of using the post-seeding element to at least partially firm the soil and provide seed to soil contact in the inter-row area after applying the cover crop seed. The method also includes the step of using the herbicide applicator to apply herbicide to the inter-row area and at least part of the adjacent standing crop row areas. The preparing, seeding, fertilizing and herbicide application steps are performed in a single pass.

In some versions, the steps described above are performed in order. In further versions, the steps begin with using the fertilizer applicator are not performed until at least four weeks after the standing crop plants are planted, with the standing crop plants being corn plants. In further versions, the steps beginning with using the fertilizer applicator are not performed until the standing crop plants, which are corn plants, are in the four to nine leaf stage. In yet further versions, the steps beginning with using the fertilizer applicator are not performed until the standing crop plants, which are corn plants, are in the range of 12-30 inches tall.

In certain embodiments, the fertilizer applicator is a sprayer operable to apply a liquid fertilizer to one of the row areas without substantial application to the inter-row area or to the standing crop plants, the sprayer applying a narrow spray centered approximately four inches from the row line. In some versions, the no-till soil preparation element comprises a plurality of coulters, including a leading, a mid, and a trailing coulter spaced apart side-to-side. In preferred versions of the method, the apparatus does not include any power driven soil preparation elements and the method comprises not performing any power driven soil preparation. Further alternatives and embodiments will be discussed hereinbelow.

BRIEF DESCRIPTION OF THE DRAWINGS

FIG. 4 is a top view of the elements of FIG. 3 along with two standing crop row lines;

FIG. 5 is a side view of the elements of FIGS. 3 and 4;

DETAILED DESCRIPTION OF THE PREFERRED EMBODIMENTS

Figure 1:
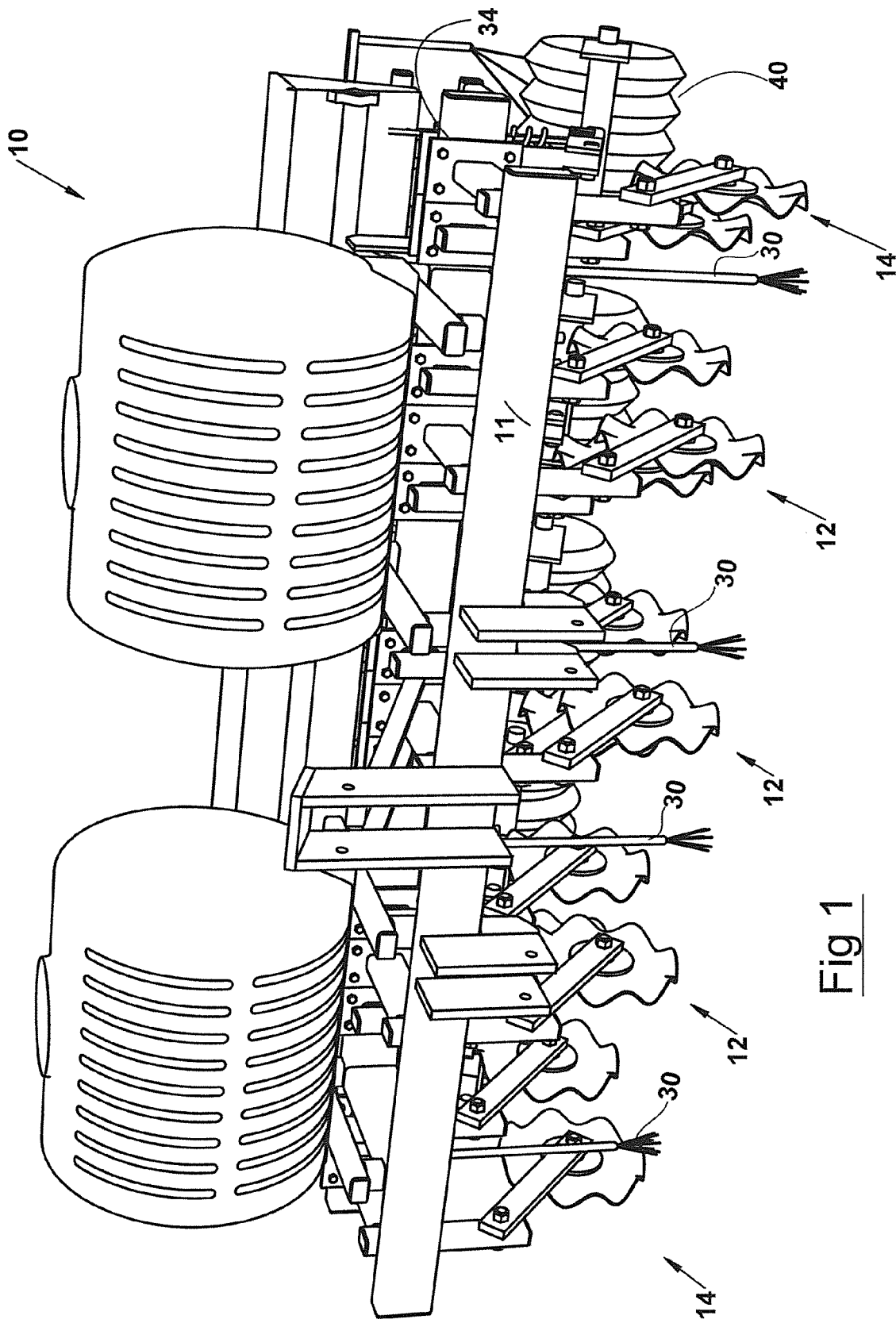
FIG. 1 is a perspective view of an embodiment of an apparatus in accordance with the present invention.

The present invention provides an apparatus and method for no-till simultaneous application of herbicide and fertilizer, soil preparation, and seeding of a cover crop in a standing crop. For purposes of definition, a "standing crop" is the primary crop, such as corn, that is planted in rows and harvested such as for grain or silage. The "cover crop" is a crop that is traditionally planted after harvesting of the standing crop for purposes of preventing soil erosion and/or improvement of the soil.

Embodiments of the present invention enable planting of a cover crop between rows of a standing crop, prior to harvest of the standing crop, while also allowing other benefits. As known to those of skill in the art, standing crops such as corn are planted with individual plants defining a line, referred to herein as a "row line". These row lines are often, but not necessarily, straight lines, and are preferably generally parallel to one another. For example, corn is often planted in parallel row lines approximately 30 inches apart.

For purposes of discussion of the present invention, it is helpful to define particular areas or zones within a field. As used herein, a "row area" or "standing crop row area" is the area surrounding the row line. It extends between generally parallel edges to each side of the row line. For example, the row area may extend 7 inches to each side of the row line, such that the row area is 14 inches wide. The remaining area between adjacent row areas may be referred to as an "inter-row area". This is where the soil is prepared and the cover crop is planted in accordance with the present invention. In the example where the row lines are 30 inches apart and the row areas are 14 inches wide, the inter-row areas are approximately 16 inches wide. As will be clear to those of skill in the art, the transition between a row area and an inter-row area is not a sharply defined line but is used herein for discussion of where or how particular parts of the inventive method are preferably practiced. For example, in some preferred embodiments of the present invention, fertilizer is applied to the row area while not applying any substantial amount of fertilizer to the inter-row area. This allows the fertilizer to be utilized primarily by the standing crop. As used herein, "simultaneous" means that the various operations, such as soil preparation, planting, and application of fertilizer and/or herbicide are accomplished within a given inter-row area during a single pass of the inventive apparatus.

In some embodiments, the invention utilizes strip or zone tillage technology between 30 inch corn rows to prepare a 16 inch wide seedbed between each row, broadcasts the cover crop seed across this area, and then incorporates the seed and packs the soil with a packing wheel assembly. At the same time, a postemergent herbicide is applied to the field, including the row area and at least part of the inter-row area, for weed control, and a liquid nitrogen fertilizer application is strategically directed approximately 4 inches off the side of the corn row, within the standing crop row area, to maximize effectiveness beyond that associated just with the delayed timing. This method and timing of combining the three operations (spraying, fertilizing and seeding a cover crop) and performing them in a no-till field provides numerous benefits. For example, it may reduce the cost and energy associated with multiple trips while facilitating these environmentally sound practices. The method also facilitates the establishment of cover crops in regions where the growing season is too short or the corn harvest is too late in the fall to allow for successful establishment of cover crops following harvest.

Embodiments of the present invention help address several current issues. The establishment of cover crops is becoming increasingly important to reduce soil and nutrient runoff into watersheds such as the Chesapeake Bay. The cover crop takes up excess nutrients and reduces runoff that could flow into the water resource. Cover crops are also being considered as a management practice that would mitigate the impacts of the removal of the corn stalks for biofuel purposes as the organic carbon produced by the cover crop could offset some of the carbon removed in stover harvest. Effective establishment of cover crops could also help reduce the establishment of weed species in corn fields during the winter and early spring and perhaps slow the development of herbicide resistant weeds in some cropping systems. In much of the U.S. corn belt, corn harvested for grain is harvested too late for cover crops to provide significant carbon, but if the cover crop was seeded during the growing season, then the carbon accumulation in the cover crop could be increased, resulting in a higher amount of corn stalks that could be removed before causing any negative impact on the soil organic matter and carbon levels.

Figure 2:
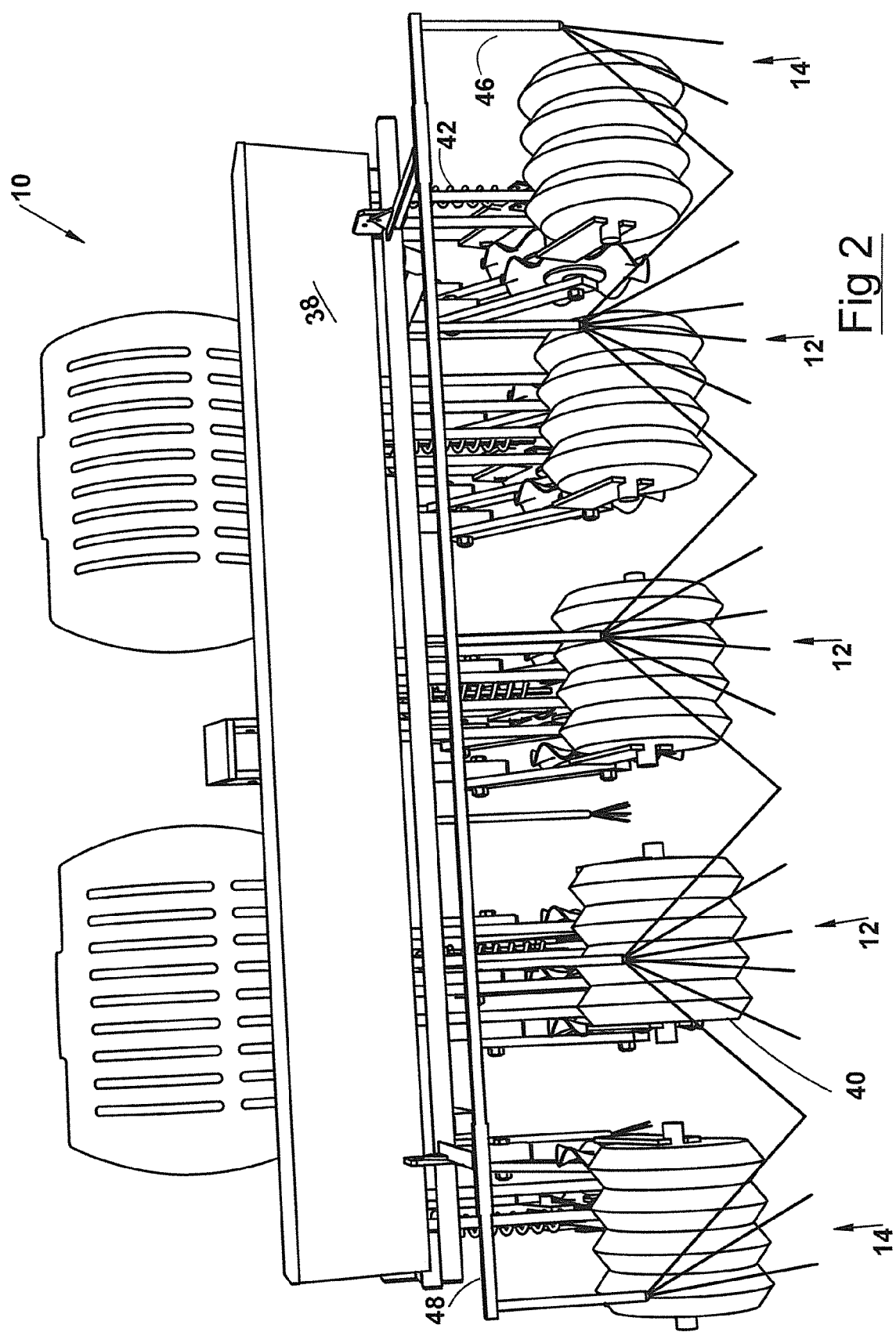
FIG. 2 is a rear perspective view of the apparatus of FIG. 1.

Referring now to the Figures, an embodiment of the present invention will be described in more detail. FIG. 1 provides a front perspective view of a no-till apparatus 10 for simultaneous application of herbicide and fertilizer, soil preparation, and seeding of a cover crop in a standing crop. Some elements, such as the seed application tubes, are excluded from this view to simplify the drawing. FIG. 2 provides a rear perspective view of the apparatus 10. The illustrated embodiment is designed to treat five inter-row areas and includes five sets of elements, each referred to as an inter-row assembly. The three central inter-row assemblies 12 are complete assemblies designed to provide all functions in a single pass. The two outboard inter-row assemblies 14 are partial assemblies and provide part of the functions in the first pass. Preferably, an operator maneuvers the apparatus such that one of the outboard assemblies 14 pass down the same inter-row area as one of the outboard assemblies previously operated on. In other words, two passes by an outboard assembly 14 provides complete processing of a given inter-row area. In alternative embodiments, only complete assemblies may be provided, or only a single outboard partial assembly may be provided.

Figure 3:
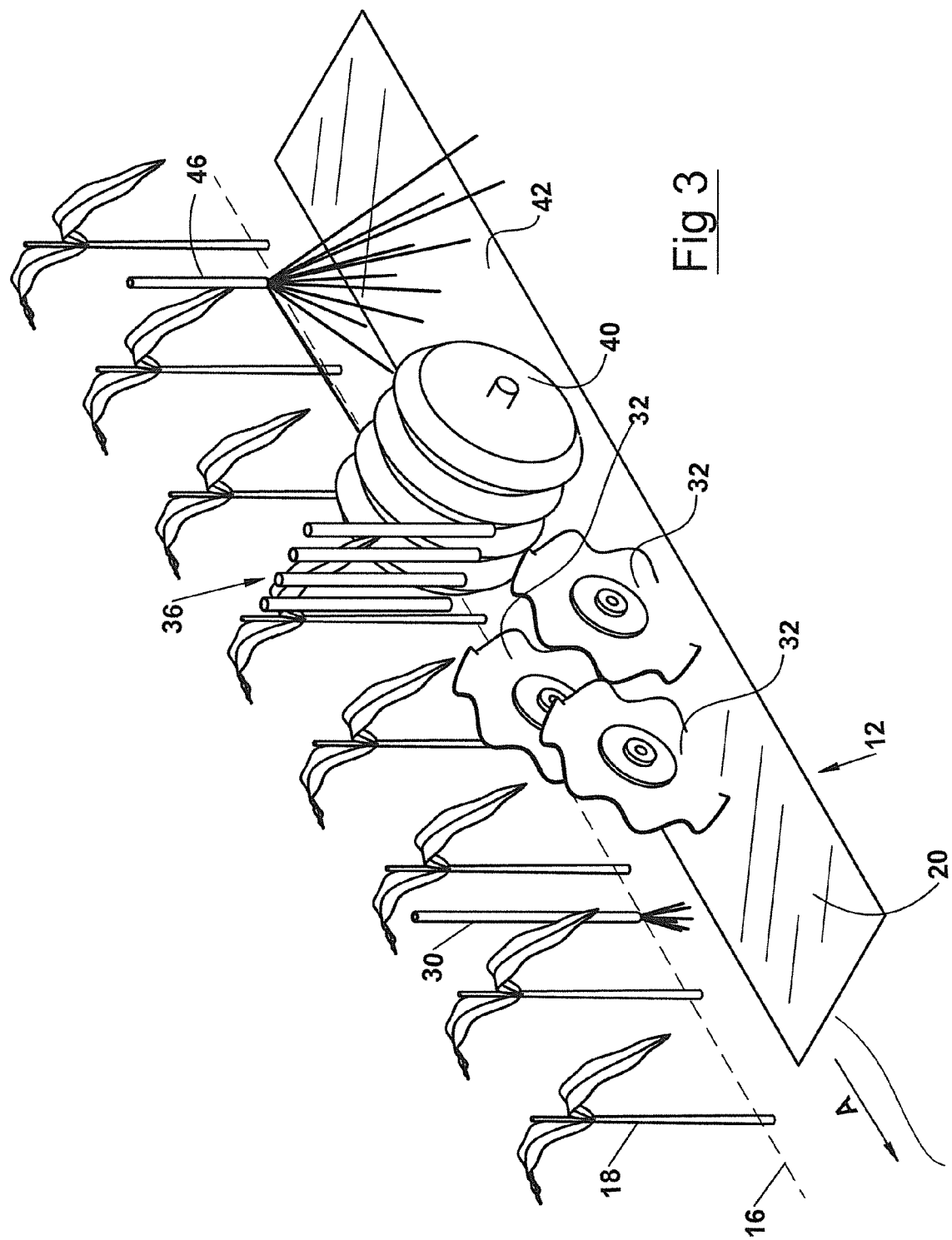
FIG. 3 is a detailed perspective view showing certain elements of an apparatus in accordance with the present invention and illustrating standing crop row lines and an inter-row area.

FIG. 3 provides a front perspective view of the components of one of the assemblies 12, along with one row line 16 of plants 18 of a standing crop. All of the supporting hardware for the illustrated components has been removed from this Figure for ease of reference. FIG. 3 also shows an inter-row area 20 as cross-hatched. FIG. 4 provides a top view of the same components as in FIG. 3, along with two row lines 16 of plants 18 of a standing crop each centered in a row area 22. FIG. 5 provides a side view of the same elements. The direction of travel of the components is indicated by arrow A.

An apparatus according to the present invention may take a variety of forms. FIGS. 1 and 2 illustrate one embodiment which is a three-point hitch implement built on a steel frame consisting of two 6×3 structural steel tubing horizontal beams. It is designed to be attached behind a tractor. The front main beam is used for attachment of the three point hitch system, two 2 inch×2 inch machine stands and mounting brackets for the water (herbicide) and nitrogen delivery systems. As will be clear to those of skill in the art, other embodiments may be structured differently and/or designed for a different hitch. As one example, a wheel carriage or semi mount hitch or semi mount lift kit may be provided. Embodiments may be provided for use with any type of tractor, or an embodiment that is self-propelled may be provided.

Referring to FIGS. 3-5, components included in a preferred embodiment of the present invention will be described in more detail. Each complete inter-row assembly 12 includes a fertilizer applicator 30 to apply fertilizer to one of the standing crop row areas 22 adjacent the inter-row area 20. In some embodiments, liquid nitrogen fertilizer is delivered to the soil surface using a drop tube assembly equipped with a solid stream spray nozzle. The fertilizer applicator is preferably designed to apply fertilizer to the row area 22 without substantial application of fertilizer to the adjacent inter-row area 20. The application of fertilizer is also preferably spaced from the row line 16 so as to avoid damage to the standing crop. In some embodiments, the spray nozzle is directed to apply fertilizer 11 inches from the center of the inter-row area. This positions the spray nozzle 4 inches from the row line and within the row area. As shown, the spray nozzle is preferably close to the ground, such as a distance in the range of 4 to 6 inches, so as to improve soil penetration.

In the illustrated embodiment, the fertilizer applicator is the first component in the direction of travel A, and therefore fertilizer is applied just ahead of the other components and beside the inter-row area, and outside where the cover crop will be planted. This application of a directed and pressurized liquid nitrogen fertilizer can improve the efficiency of the use of the fertilizer through placement and partial incorporation of the material below the soil surface. The fertilizer is also directed away from the inter-row area, which will be seeded with the cover crop, so that it does not stimulate the initial growth of the cover crop, which could provide excessive competition to the standing crop and reduce yields. While the fertilizer applicator is illustrated as being first in the direction of travel A, those of skill in the art will appreciate that the fertilizer applicator may be positioned more forwardly or rearwardly if desired. However, the forward positioning is preferred for some embodiments. In the embodiment of FIGS. 1 and 2, the fertilizer sprayers may be attached to the front main beam 11 of the apparatus. As appreciated by those of skill in the art, the fertilizer used may be nitrogen, other liquid fertilizers such as including potassium or phosphate/phosphorus, as well as other fertilizers. The invention may alternatively provide for the use of non-liquid fertilizers using different fertilizer applicators. However, liquid application of fertilizer is preferred for certain embodiments.

In the illustrated embodiment, the next component, rearward of the fertilizer applicator 30, is the no-till soil preparation element. In the illustrated embodiment, this element takes the form of three coulter disks 32. The inboard complete inter-row assemblies may each include three 15-inch diameter 8 wave coulters that are 2" wide, with the middle coulter set to run 12 inches ahead of the second coulter, which is 8 inches ahead of the third coulter. FIGS. 3-5 show the coulters spaced apart fore-to-aft by less distance than this. The coulters may be spaced apart side to side by approximately 4 inches, for a total prepared seedbed of approximately 16 inches. This prepared seedbed generally defines the inter-row area 20. This configuration of the three two 2-inch wavy coulters spaced at four inches apart is preferred for some embodiments, as experiments demonstrated that this configuration provided an effective soil disturbance for creating a seedbed in the dry, hard soils sometimes encountered in this situation. Other configurations, such as 1-inch wavy coulters or Turbo-till coulters, did not provide adequate soil disturbance required for good soil to seed contact, but may be used in some embodiments. Further embodiments may make use of less aggressive coulters, such as a fluted or notched coulter. In such an embodiment, it would be preferred to dispense seed in the area being these coulters. Further embodiments may use other types of soil preparation elements.

Figure 6:
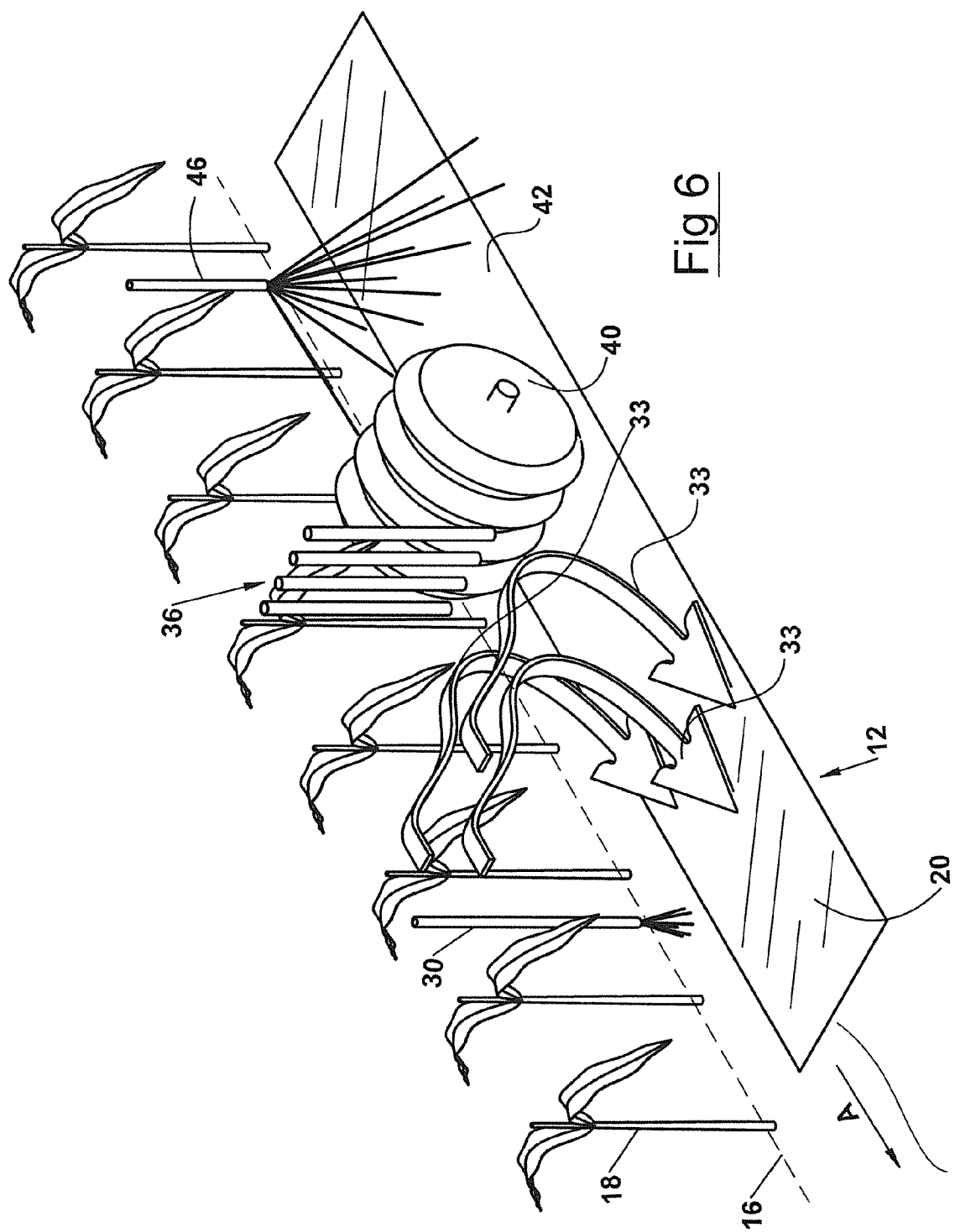
FIG. 6 is a perspective view of elements of an alternative embodiment of the present invention.

FIG. 6 illustrates elements of an embodiment of the present invention that makes use of cultivators 33 in place of the coulters. They may be useful in some embodiments of the present invention, and may be used in organic farming without an herbicide applicator.

Referring back to FIGS. 1 and 2, it can be seen that the outboard inter-row assemblies each have two coulters, with the inside coulter in some embodiments set to run 20 inches ahead of the outside coulters. When a second pass of the apparatus is made, the outside assembly will run back in the same row and provide a similar seedbed as the inboard assemblies that are prepared with a single pass of the three-coulter configuration.

It should be noted that the soil preparation element, represented by the coulters, is referred to as a no-till soil preparation element because it is designed for use in a no-till field. Specifically, the coulters cut through crop residue that is typically present in the inter-row areas in a no-till field, and at break up the surface of the soil under the residue to prepare it for seeding. This also at least partially exposes the soil to receive the cover crop seeds. In some embodiments, the soil preparation element provides a seedbed that allows planting of seed at approximately ¼ inch depth in the soil. This is ideal for cover crop seeds such as ryegrass and clover. Other possible cover crops include red clover, white clover, crimson clover, annual medics, annual ryegrass, Italian ryegrass, canola, fine fescue, Kentucky bluegrass, orchard grass, and other grasses, and may also include other crops that those of skill in the art will recognize as being useful for this application. Different depths may be chosen depending on the cover crop used. It is also noted that the soil preparation element does not create furrows and planting of the cover crop does not take place in furrows as is traditional with many crops. A further distinction between the soil preparation element that forms part of the present invention and other devices is that the soil preparation element is not power driven, such as by a power takeoff (PTO) of farm machinery. Preferred embodiments of the present invention include no power-driven soil working elements.

Embodiments of the present invention using coulters and other soil preparation elements with similar effect also qualify as a no-till apparatus. Such an apparatus is one that meets the generally accepted definition of no-till wherein no full width tillage is performed. As such, a no-till apparatus may perform some tillage, such as only in the inter-row areas. The overall apparatus using the elements of FIG. 1 would meet this definition. As used herein, a no-till apparatus also lacks any power driven soil preparation element. As used herein, the soil preparation elements themselves are defined as no-till soil preparation elements if they are operable to cut through crop residue typically present in a no-till field. The apparatus is heavy enough, or is sufficiently weighted, to allow the no-till soil preparation elements to cut through the residue. The various types of coulters as described herein meet this definition. It should be noted that the cultivators shown in FIG. 6 typically would not be used in a no-till field, but may be used in an organic farming operation where no-till is not practiced.

The rear main beam 34 of the apparatus 10 may be used for mounting the coulters. The coulters in some embodiments may be Unverferth Zone Till Coulter assemblies as described in U.S. Pat. No. 5,370,068, with mounting units and coulters.

After the soil preparation element prepares the seedbed in the inter-row area 20, seed may be planted. A cover crop seed applicator 36 is provided to apply cover crop seed across the inter-row area 20. As used herein, "across the inter-row area" means that seed is not planted in a single part or row within the inter-row area, but that seed is planted such that most of the inter-row area will grow a cover crop. In the illustrated embodiment, the cover crop seed applicator 36 consists of a plurality of seed tubes positioned generally side by side so as to apply seed to most or all of the inter-row area. In some embodiments, the seed delivery system consists of 4 plastic tubes for the inboard assemblies and 2 plastic tubes for the outboard assemblies. The tubes are positioned to deliver the seed immediately after the coulters and just prior to a post-seeding element or packing wheel, as discussed below. As shown, the seed tubes may have lower ends that are spaced from the ground by a significant distance, such as in the range of 8 to 18 inches so as to enhance the dispersion of the seed across the inter-row area. It is preferred that the seed tube ends be positioned such that they are below the leaves of the standing crop, referred to as the canopy, to avoid interference between the leaves and the seeds.

In the embodiment illustrated in FIGS. 1 and 2, the seed tubes are held in place using a bracket attached to a steel horizontal pipe to provide stability. A seed box 38 may be driven by a hydraulic motor and chain drive. The hydraulic motor may be driven using the hydraulic system of the tractor. The seed delivery rate can be adjusted using a calibration system on the box, and consists of a slide that opens the seed openings on the bottom of the box. The seed box for the illustrated embodiment may be a modified 10 foot Gandy Seed Box.

It should be noted that the seed applicator seeds the cover crop over most or all of the inter-row area and does not plant in furrows or row lines. Some seeds may be dispersed outside of the inter-row area, but the focus is on planting most or all of the inter-row area so as to establish the cover crop. As will be clear to those of skill in the art, other seed applicators may be used, such as an air-delivery seed system.

Figure 7:
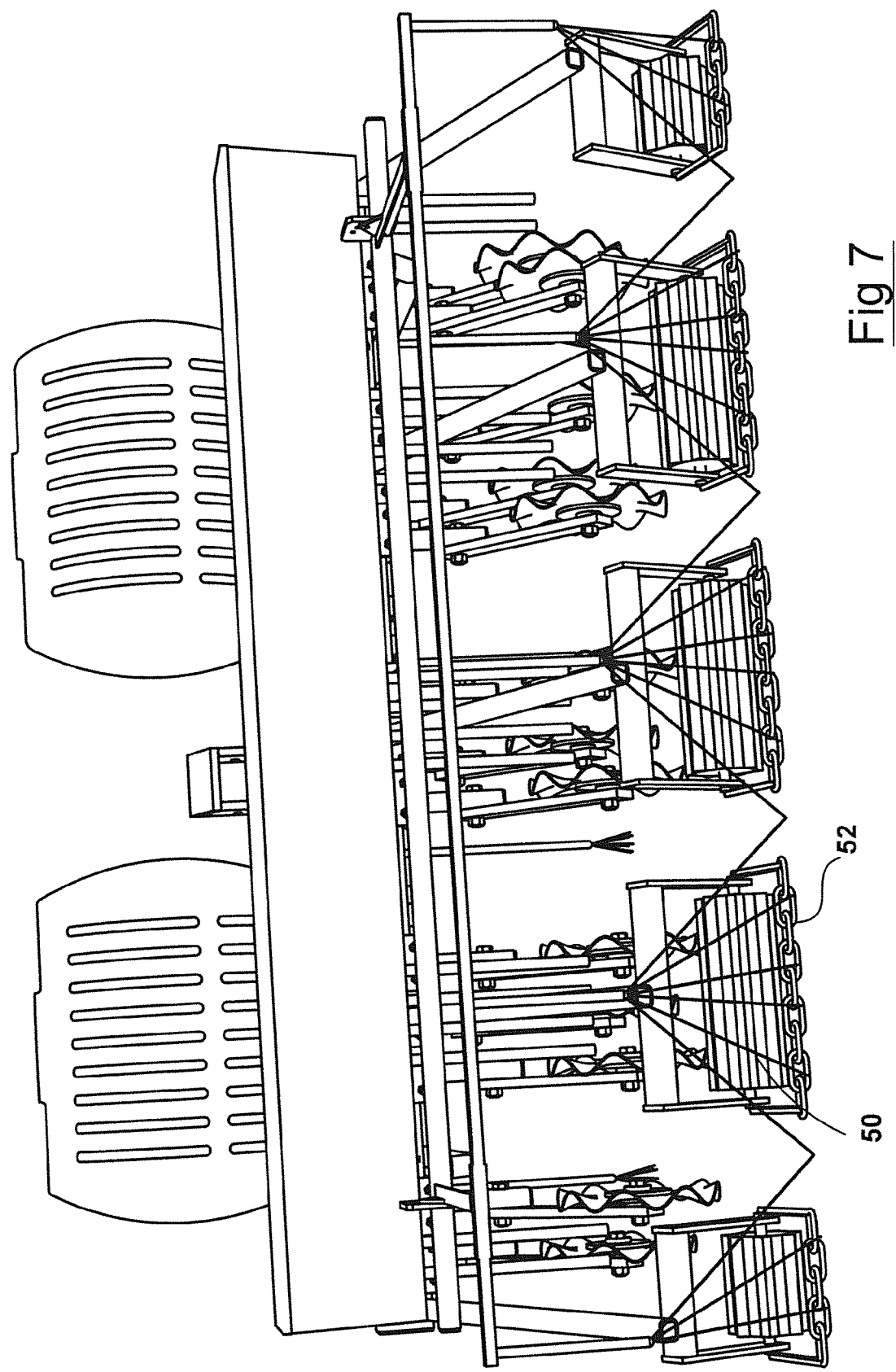
FIG. 7 is a rear perspective view of a further alternative embodiment of an apparatus in accordance with the present invention.

After the seed applicator 36, a post seeding element is provided to at least partially pack or firm the soil in the inter-row area after the seed applicator applies seed. This may cover and embed some of the cover crop seed to increase the seed-to-soil contact. In the illustrated embodiment, the post seeding element is a spring loaded packing wheel 40. The packing wheel 40 has parallel ridges, as shown. The packing wheel may also be referred to as a cultipacker. The spring for spring loading one of the packing wheels is shown at 42 in FIG. 2. Alternative embodiments may use a non-spring-loaded packing wheel. In another alternative embodiment, the post seeding element consists of rolling drums with 1.5 inch angle iron welded to form a rolling cultipacker assembly 50, as shown in FIG. 7. Either assembly may be attached to the remainder of the apparatus 10 with a hinged 22 inch 2×2 inch structural steel tubing. In some embodiments, the cultipackers are 16 inches wide for the inboard assemblies and 8.5 inches wide for the outboard assemblies. The post seeding element may alternatively or additionally include drag chains 52, such as shown in FIG. 7. In an exemplary embodiment, the drag chains consist of 24 inches of 5/16 inch steel chain attached to the rear of each of the cultipacker assemblies to provide seed coverage.

After the post-seeding element, preferred embodiments of the present invention include an herbicide applicator 46 for applying herbicide to the inter-row area and at least part of the standing crop row areas. As shown in FIG. 2, the applicators 46 may be part of a spray boom 48. The herbicide applicator 46 may be a spray nozzle with a wide spray pattern, and the nozzle may be positioned at a significant distance above the ground, such as in the range of 15 to 24 inches. It is preferred that the spray nozzle be positioned such that it is below the leaves of the standing crop.

As known to those of skill in the art, a well developed standing crop will have leaves that generally define a canopy. For corn, this canopy is part way up the stalk. Below this canopy, only limited leaf growth occurs for the standing crop. This canopy is represented by two leaves for each plant 18 in FIGS. 3-5. This canopy may be said to be at a canopy height H, as shown in FIG. 5. In some embodiments, the sprayer tip for the fertilizer applicator 30, the lower ends of the seed tubes 36, and the sprayer tip for the herbicide applicator 46 are all below the canopy height H. In some embodiments of a method in accordance with the present invention, cover crop application is done after the canopy height is at least 12 inches high, for corn.

In some embodiments, the apparatus further includes a guidance system. For example, it may include a Sukup Auto Guide row guidance system, a GPS guidance system, or an RTK guidance system. An Auto Guide system may automatically guide the placement of the apparatus precisely between the rows to minimize damage to existing plants in the row.

The herbicide system may be supplied by one of two 110-gallon poly tanks mounted on top of the two beams. The second poly tank may be the supply for the liquid nitrogen fertilizer (urea ammonium nitrate solution) application system, and may be powered by a PTO driven pump. For example, the pump may be rated at 7 GPM and 150 PSI. The liquid herbicide and fertilizer storage tanks also provide a secondary benefit: they add significant weight to the apparatus, which helps the coulters penetrate soils under conditions where the soil penetration resistance is high. Steel suitcase weights can also be added to the apparatus if necessary. The illustrated embodiment of the apparatus requires a tractor of approximately 100 horsepower equipped with front suitcase weights and can be operated at up to 6 mph in the field.

The illustrated embodiment of the present invention is a "4 row" unit, meaning that it processes inter-row areas around 4 rows of standing crop plants. Other size units may be provided by adding additional inter-row assemblies. Examples include 6, 8, 12 and 16 row units.

The present invention also provides a method for no-till inter-row cover crop seeding, along with application of fertilizer and/or herbicide. According to some embodiments of the method, the apparatus is designed to be operated in planted corn fields approximately 4 to 7 weeks after planting when the corn is in the 4 to 9 leaf stage and is about 12 to 30 inches tall. This is the ideal time frame to apply supplemental nitrogen fertilizer since it coincides with the stage of growth when nutrient uptake by the plants is increasing rapidly. This reduces the exposure of the fertilizer to environmental conditions that could cause it to be lost in runoff or leaching events. It is also the optimum time for postemergent herbicide applications to control any weeds that may have escaped from the initial herbicide applications to the crop. Use of the present invention may allow the farmer to skip the use of preemergent herbicide at the time of planting of the standing crop. This is also a an optimum time to seed an in-season cover crop since the crop canopy is developing rapidly and would shade emerging cover crop seedlings, limiting their ability to compete with the crop. As one example, in Pennsylvania, the ideal timing of this operation would occur in early to mid. June for fields planted with a standing crop in late April or early May.

In accordance with an embodiment of a method of the present invention, the standing crop, which may be corn, is planted using traditional methods. This may occur in late April or early May in many areas. Then, after 4 to 7 weeks, an apparatus as described herein is used to fertilize the standing crop, prepare the soil in the inter-row area, plant cover crop seeds, embed the seed, and herbicide is applied. Instead of using 4 to 7 weeks as the trigger to use the present apparatus, the trigger may be when the corn is in the 4 to 9 leaf stage and/or when the corn is 12 to 30 inches tall. At a later time, the standing crop is harvested without harvesting the cover crop. In many areas, they may occur in October or November. At a later date, the stover may be harvested and/or the cover crop may be used for forage. The following season, a new standing crop, such as corn, may be planted between the cover crop areas.

The apparatus could be used earlier in the season, especially when there is a need for an earlier herbicide or fertilizer application, but there could be an increased risk of competition from the cover crop with the standing crop. Later in the season, there would be more chance of mechanical damage to the corn with the apparatus and this would be past the ideal window for most herbicide and fertilizer applications. There is also the potential of using the apparatus in other crops planted in wider rows, such as soybeans. As will be clear to those of skill in the art, other crops may also be used as the standing crop, and this may necessitate adjustments or modifications to the disclosed embodiments to accommodate these other crops. Embodiments of the present invention could be used with so called twin row corn planting, where two rows of corn are positioned side by side with a gap, such as 22 inches, to the next twin row. In this case, the crop row comprises the twin rows and the row area includes the twin rows and the area to each side of them. Modified embodiments may also be used with corn planted in narrower rows, such as 20 inch single rows. Yet further embodiments may be configured for other crops, such as planting cover crops in wheat stubble, clover in hay, or other crops.

Preferably, the standing crop is harvested while leaving the cover crop in place. By the time of harvesting, the cover crop should be sufficiently established that farm machinery driving over it will not destroy it.

As will be clear to those of skill in the art, the herein described embodiments of the present invention may be altered in various ways without departing from the scope or teaching of the present invention. As such, this disclosure should be interpreted broadly.

We claim:

1. An apparatus for simultaneous application of herbicide and fertilizer, soil preparation, and seeding of a cover crop in a standing crop in a no-till field, the plants of the standing crop defining a plurality of generally parallel row lines, a standing crop row area being defined around each row line so as to contain the row line of plants and extending between generally parallel edges to each side of the row line, an inter-row area being defined between each pair of adjacent standing crop row areas and extending between the closest edges of the adjacent standing crop row areas, the apparatus comprising:

a plurality of inter-row assemblies each configured to pass along one of the inter-row areas between adjacent row lines of standing crop plants, each assembly including;

a fertilizer applicator operable to apply fertilizer to one of the standing crop row areas adjacent the inter-row area without substantial application of fertilizer to the inter-row area;

a no-till soil preparation element operable to prepare soil in the inter-row area for cover crop seeding without forming a furrow, the soil having an upper surface with no-till crop residue disposed thereon, the no-till soil preparation element being operable to generally cut through the crop residue so as to at least break up an upper surface of soil under the residue for cover crop seeding;

a cover crop seed applicator operable to apply cover crop seed across the inter-row area after the soil preparation element;

a post-seeding element operable to at least partially firm the soil and provide seed to soil contact in the inter-row area after the seed applicator applies seed; and an herbicide applicator operable to apply herbicide to the inter-row area and at least part of the adjacent standing crop row areas;

wherein the apparatus prepares the soil, applies seed and firms the soil in the inter-row areas, applies fertilizer to the standing crop row areas and applies herbicide to the inter-row and standing crop row areas.

2. An apparatus in accordance with claim 1, further comprising a support frame for supporting the plurality of inter-row assemblies.

3. An apparatus in accordance with claim 1, wherein the fertilizer applicator is a sprayer operable to apply a liquid fertilizer to one of the row areas without substantial application to the inter-row area or to the standing crop plants.

4. An apparatus in accordance with claim 3, wherein the fertilizer sprayer applies a narrow spray centered approximately four inches from the row line.

5. An apparatus in accordance with claim 1, wherein the no-till soil preparation element comprises a plurality of coulters.

6. An apparatus in accordance with claim 5, wherein the plurality of coulters comprises 3 coulters, including a leading, a mid, and a trailing coulter, each coulter being approximately 2 inches wide, the coulters being spaced apart side to side by approximately 4 inches.

7. An apparatus in accordance with claim 1, wherein the apparatus does not include any power driven soil preparation elements.

8. An apparatus in accordance with claim 1, wherein the seed applicator comprises a plurality of seed tubes positioned side by side.

9. An apparatus in accordance with claim 1, wherein the post-seeding element comprises a packing wheel.

10. An apparatus in accordance with claim 9, wherein the post-seeding element further comprises a spring loading mechanism operable to urge the packing wheel toward the soil.

11. An apparatus in accordance with claim 1, wherein the herbicide applicator is a sprayer operable to spray herbicide in a wide pattern.

12. A no-till apparatus for simultaneous application of fertilizer, soil preparation, and seeding of a cover crop in a standing crop, the plants of the standing crop defining a plurality of generally parallel row lines, a standing crop row area being defined around each row line so as to contain the row line of plants and extending between generally parallel edges to each side of the row line, an inter-row area being defined between each pair of adjacent standing crop row areas and extending between the closest edges of the adjacent standing crop row areas, the apparatus comprising:

a plurality of inter-row assemblies each configured to pass along one of the inter-row areas between adjacent row lines of standing crop plants, each assembly including;

a fertilizer applicator operable to apply fertilizer to one of the standing crop row areas adjacent the inter-row area without substantial application of fertilizer to the inter-row area;

a no-till soil preparation element operable to prepare soil in the inter-row area for cover crop seeding without forming a furrow, the soil having an upper surface with no-till crop residue disposed thereon, the no-till soil preparation element being operable to generally cut through the crop residue so as to at least break up an upper surface of soil under the residue for cover crop seeding;

a cover crop seed applicator operable to apply cover crop seed across the inter-row area after the soil preparation element; and a post-seeding element operable to at least partially firm the soil and provide seed to soil contact in the inter-row area after the seed applicator applies seed;

wherein each assembly prepares the soil, applies seed and firms the soil in one of the inter-row areas and applies fertilizer to one of the standing crop row areas in a single pass.

13. A no-till method of planting a cover crop between the rows of a standing crop and simultaneously applying fertilizer and herbicide, the plants of the standing crop defining a plurality of generally parallel row lines, a standing crop row area being defined around each row line so as to contain the row line of plants and extending between generally parallel edges to each side of the row line, an inter-row area being defined between each pair of adjacent standing crop row areas and extending between the closest edges of the adjacent standing crop row areas, the method comprising the steps of:

a) providing a no-till apparatus for simultaneous application of herbicide and fertilizer, soil preparation, and seeding of a cover crop in a standing crop, the apparatus comprising a plurality of inter-row assemblies each configured to pass along one of the inter-row areas between adjacent row lines of standing crop plants, each assembly including;
a fertilizer applicator;
a no-till soil preparation element;
a cover crop seed applicator;
a post-seeding element; and
an herbicide applicator;

b) using the fertilizer applicator to apply fertilizer to one of the standing crop row areas adjacent the inter-row area without substantial application of fertilizer to the inter-row area;

c) using the no-till soil preparation element to prepare soil in the inter-row area without forming a furrow, the soil having an upper surface with no-till crop residue disposed thereon, the no-till soil preparation element generally cutting through the crop residue so as to at least break up an upper surface of soil under the residue for cover crop seeding;

d) using the cover crop seed applicator to apply cover crop seed across the inter-row area after using the soil preparation element;

e) using the post-seeding element to at least partially firm the soil and provide seed to soil contact in the inter-row area after applying the cover crop seed; and f) using the herbicide applicator to apply herbicide to the inter-row area and at least part of the adjacent standing crop row areas;

wherein the preparing, seeding, fertilizing and herbicide applicating steps are performed in a single pass.

14. A method in accordance with claim 13, wherein steps a-f are performed in order.

15. A method in accordance with claim 13, wherein the standing crop plants are corn plants and steps b-f are not performed until at least 4 weeks after the corn seeds are planted.

16. A method in accordance with claim 13, wherein the standing crop plants are corn plants and steps b-f are not performed until the corn plants are in the 4 to 9 leaf stage.

17. A method in accordance with claim 13, wherein the standing crop plants are corn plants and steps b-f are not performed until the corn plants are in the range of 12 to 30 inches tall.

18. A method in accordance with claim 13, wherein the fertilizer applicator is a sprayer operable to apply a liquid fertilizer to one of the row areas without substantial application to the inter-row area or to the standing crop plants, the fertilizer sprayer applying a narrow spray centered approximately four inches from the row line.

19. A method in accordance with claim 13, wherein the no-till soil preparation element comprises a plurality of coulters, including a leading, a mid, and a trailing coulter spaced apart side to side.

20. A method in accordance with claim 13, wherein the apparatus does not include any power driven soil preparation elements and the method comprises not performing any power driven soil preparation.

* * * * *